(12) United States Patent
Hui et al.

(10) Patent No.: US 8,824,471 B2
(45) Date of Patent: Sep. 2, 2014

(54) MAINTAINED MESSAGE DELIVERY DURING ROUTING DOMAIN MIGRATION

(75) Inventors: Jonathan W. Hui, Foster City, CA (US); Jean-Philippe Vasseur, Saint Martin dUriage (FR)

(73) Assignee: Cisco Technology, Inc., San Jose, CA (US)

( * ) Notice: Subject to any disclaimer, the term of this patent is extended or adjusted under 35 U.S.C. 154(b) by 387 days.

(21) Appl. No.: 13/151,010

(22) Filed: Jun. 1, 2011

(65) Prior Publication Data

US 2012/0307825 A1     Dec. 6, 2012

(51) Int. Cl.
*H04L 12/28*     (2006.01)

(52) U.S. Cl.
USPC ............ 370/390; 370/235; 370/392; 709/225

(58) Field of Classification Search
None
See application file for complete search history.

(56) References Cited

U.S. PATENT DOCUMENTS

| | | | |
|---|---|---|---|
| 6,965,615 B1 | 11/2005 | Kerr et al. | |
| 7,072,972 B2 * | 7/2006 | Chin et al. | 709/231 |
| 7,215,641 B1 | 5/2007 | Bechtolsheim et al. | |
| 7,215,674 B1 | 5/2007 | Vyas et al. | |
| 7,269,139 B1 | 9/2007 | Williams, Jr. et al. | |
| 7,334,029 B2 * | 2/2008 | Shiga et al. | 709/223 |
| 7,436,767 B1 | 10/2008 | Wei | |
| 7,522,595 B2 | 4/2009 | Ben-Dvora et al. | |
| 7,542,423 B1 | 6/2009 | Morishige et al. | |
| 7,565,446 B2 * | 7/2009 | Talagala et al. | 709/238 |
| 7,583,590 B2 * | 9/2009 | Sivakumar et al. | 370/217 |
| 7,613,200 B1 | 11/2009 | Williams, Jr. et al. | |
| 7,640,298 B2 * | 12/2009 | Berg | 709/203 |
| 7,672,323 B2 | 3/2010 | Sundaram et al. | |
| 7,813,737 B1 * | 10/2010 | Barrow | 455/445 |
| 7,818,454 B2 * | 10/2010 | Kim et al. | 709/245 |
| 7,822,043 B2 | 10/2010 | Vyas et al. | |
| 7,840,217 B2 | 11/2010 | Patel et al. | |
| 7,996,532 B2 * | 8/2011 | Phanse | 709/226 |
| 8,069,218 B1 * | 11/2011 | Tormasov et al. | 709/216 |
| 8,112,500 B2 * | 2/2012 | Saito et al. | 709/218 |
| 8,190,769 B1 * | 5/2012 | Shukla et al. | 709/238 |
| 8,234,377 B2 * | 7/2012 | Cohn | 709/225 |

(Continued)

OTHER PUBLICATIONS

"RPL: IPv6 Routing Protocol for Low Power and Lossy Networks" <draft-ieff-roll-rpl-19> by Winter, at al. (Mar. 13, 2011 version).

(Continued)

*Primary Examiner* — Michael J Moore, Jr.
(74) *Attorney, Agent, or Firm* — Edwards Wildman Palmer LLP; James M. Behmke; Stephen D. LeBarron

(57) ABSTRACT

In one embodiment, an ingress device of a first routing domain in a computer network buffers received packets, and in response to receiving a request from a particular node indicating that the particular node has migrated from the first routing domain to a second routing domain, determines how to reach the particular node in the second routing domain, and forwards the buffered received packets to the particular node in the second routing domain, accordingly. In another embodiment, a device in the first routing domain migrates from the first routing domain to a second routing domain, and determines its new IP address. The device may then send a request to the first ingress router to forward buffered packets for the device to the second routing domain at the new IP address, and may thus receive buffered packets forwarded from the first ingress router at the device in the second routing domain.

19 Claims, 12 Drawing Sheets

(56) References Cited

U.S. PATENT DOCUMENTS

| | | | |
|---|---|---|---|
| 8,239,583 B2 * | 8/2012 | Corry et al. | 710/8 |
| 8,244,864 B1 * | 8/2012 | Bahl et al. | 709/225 |
| 8,281,013 B2 * | 10/2012 | Mundkur et al. | 709/226 |
| 8,341,290 B2 * | 12/2012 | Berg | 709/238 |
| 8,467,392 B2 * | 6/2013 | Li et al. | 370/392 |
| 2007/0061465 A1 * | 3/2007 | Kim et al. | 709/226 |
| 2009/0274047 A1 | 11/2009 | Kruys et al. | |
| 2010/0250786 A1 * | 9/2010 | Corry et al. | 710/8 |

OTHER PUBLICATIONS

"Routing Metrics used for Path Calculation in Low Power and Lossy Networks" <draft-ietf-roll-routing-metrics-19> by Vasseur, et al. (Mar. 1, 2011 version).

"RPL Objective Function 0" <draft-ietf-roll-of0-11> by Thubert (May 5, 2011 version).

"The Minimum Rank Objective Function with Hysteresis" <draft-ietf-roll-minrank-hysteresis-of-03> by O. Gnawali et al. (May 3, 2011 version).

* cited by examiner

| PACKETS 710 | TAG/TIMESTAMP 720 |
|---|---|
| A | T1 |
| B | T2 |
| C | T3 |
| D | T4 |

TABLE 700

RECEIVED UP TO "T2"

FORWARDED

FIG. 7

MAINTAINED MESSAGE DELIVERY DURING ROUTING DOMAIN MIGRATION

TECHNICAL FIELD

The present disclosure relates generally to computer networks, and, more particularly, to message deliver during routing domain migration.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Large scale LLNs are typically divided into smaller more manageable sub-networks or "routing domains" (often called a personal area network or "PAN", such as when using IEEE 802.15.4 terminology). Devices participate in only one routing domain at a time. Due to the scale and embedded nature of LLNs, devices autonomously join a routing domain and form associated routes to allow the forwarding of traffic. From time to time, LLN devices may choose to switch to a different routing domain, called routing domain migration. For example, one cause of routing domain migration is the loss of connectivity to other devices in the routing domain. Another cause is an attempt to optimize communication performance (e.g., by moving to a routing domain with fewer nodes or attaching to a device that advertises a lower route cost).

After joining a new routing domain, the device must obtain a new address (especially when address prefixes are bound to routing domains), discover new routes, advertise its new address, and notify other services of its new address. As a result, during the migration process, services attempting to send traffic to the migrated device will use the old address and messages will not be properly routed to the device.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example of an associated between buffered packets and timestamps;

DESCRIPTION OF EXAMPLE EMBODIMENTS

Overview

Figure 1:
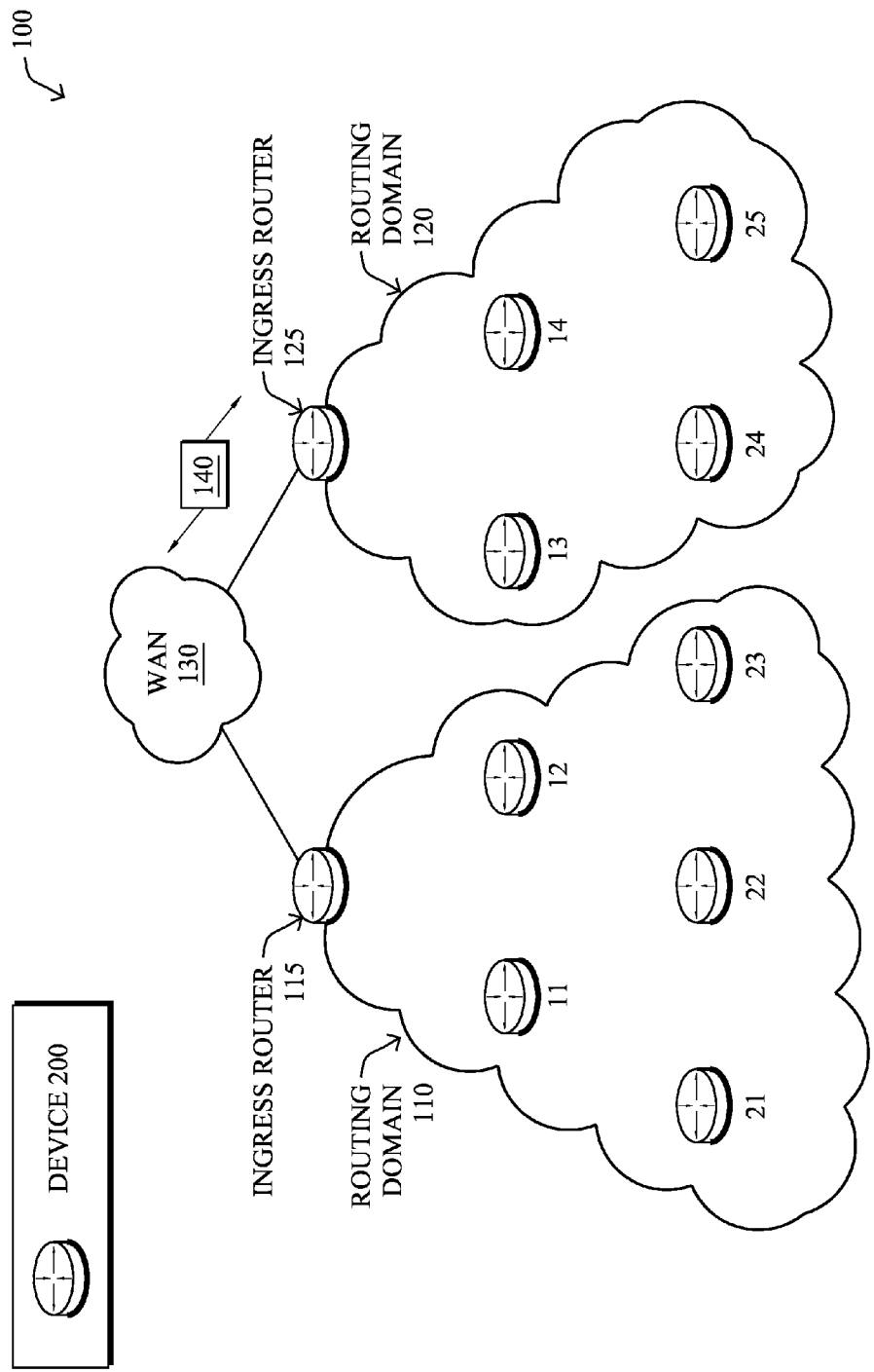
FIG. 1 illustrates an example computer network.

According to one or more embodiments of the disclosure, an ingress device of a first routing domain in a computer network buffers received packets, and in response to receiving a request from a particular node indicating that the particular node has migrated from the first routing domain to a second routing domain, determines how to reach the particular node in the second routing domain, and forwards the buffered received packets to the particular node in the second routing domain, accordingly.

According to one or more additional embodiments of the disclosure, a device in the first routing domain migrates from the first routing domain to a second routing domain, and determines its new IP address. The device may then send a request to the first ingress router to forward buffered packets for the device to the second routing domain at the new IP address e.g., via some tunneling techniques, and may thus receive buffered packets forwarded from the first ingress router at the device in the second is routing domain.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

FIG. 1 is a schematic block diagram of an example computer network 100 illustratively comprising nodes/devices 200 (e.g., labeled as shown, "11," "12," . . . "24," "25," and described in FIG. 2 below) interconnected by various methods of communication. For instance, the links may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Other devices 200, such as ingress routers 115 and 125, may provide access for particular routing domains, 110 and 120, respectively, which may be directly interconnected, or else connected via a network (e.g., WAN) 130 as shown.

Those skilled in the art will understand that any number of nodes, devices, links, etc. may be used in the computer network, and that the view shown herein is for simplicity. Also, those skilled in the art will understand that while nodes/devices 115 and 125 are referred to as "ingress routers," their functionality is to provide connectivity into and out of the routing domains.

Data packets 140 (e.g., traffic and/or messages sent between the devices/nodes) may be exchanged among the nodes/devices of the computer network 100 using predefined network communication protocols such as certain known wired or wireless protocols (e.g., IEEE Std. 802.15.4 (or 15.4 g), WiFi, Bluetooth®, etc.) or other shared media protocols where appropriate (e.g., PLC). In this context, a protocol consists of a set of rules defining how the nodes interact with each other.

Figure 2:
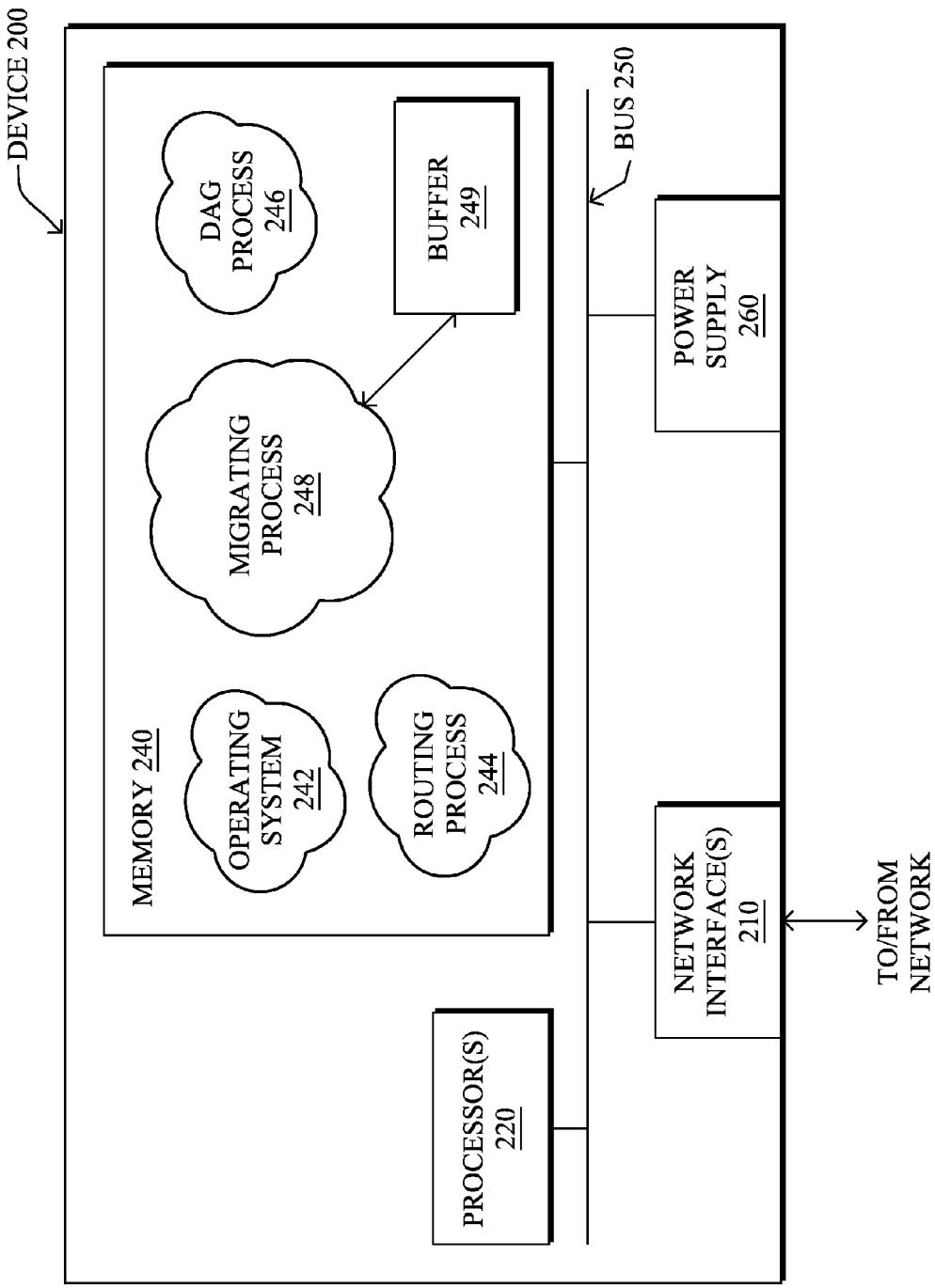
FIG. 2 illustrates an example network device/node.

FIG. 2 is a schematic block diagram of an example device 200 that may be used with one or more embodiments described herein, e.g., as a node (11-25) and/or an ingress router 115/125. The device may comprise one or more network interfaces 210, at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100 (e.g., wired, wirelessly, via PLC, etc.). The network interfaces may be configured to transmit and/or receive data using a variety of different communication protocols, particularly depending upon the underlying transmission medium (e.g., wireless, PLC, wired, etc.). Note, further, that a node may have two different types of network connections 210, namely, wireless and wired/physical connections, and that the view herein is merely for illustration. For example, the ingress routers, such as field area routers (FARs), may comprise a wired connection to network 130, and a wireless connection to the nodes within the domain (e.g., 11-25).

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245, such as a "buffer" 249 (on ingress routers 115/125). An operating system 242, portions of which are typically resident in memory 240 and executed by the processor, functionally organizes the device by, inter alia, invoking operations in support of software processes and/or services executing on the device. For instance, these software processes and/or services may comprise routing process/services 244, which may include a directed acyclic graph (DAG) process 246 in certain embodiments, and also an illustrative routing domain migrating process 248 as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-11> by Thubert (May 5, 2011 version) and "The Minimum Rank Objective Function with Hysteresis"<draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
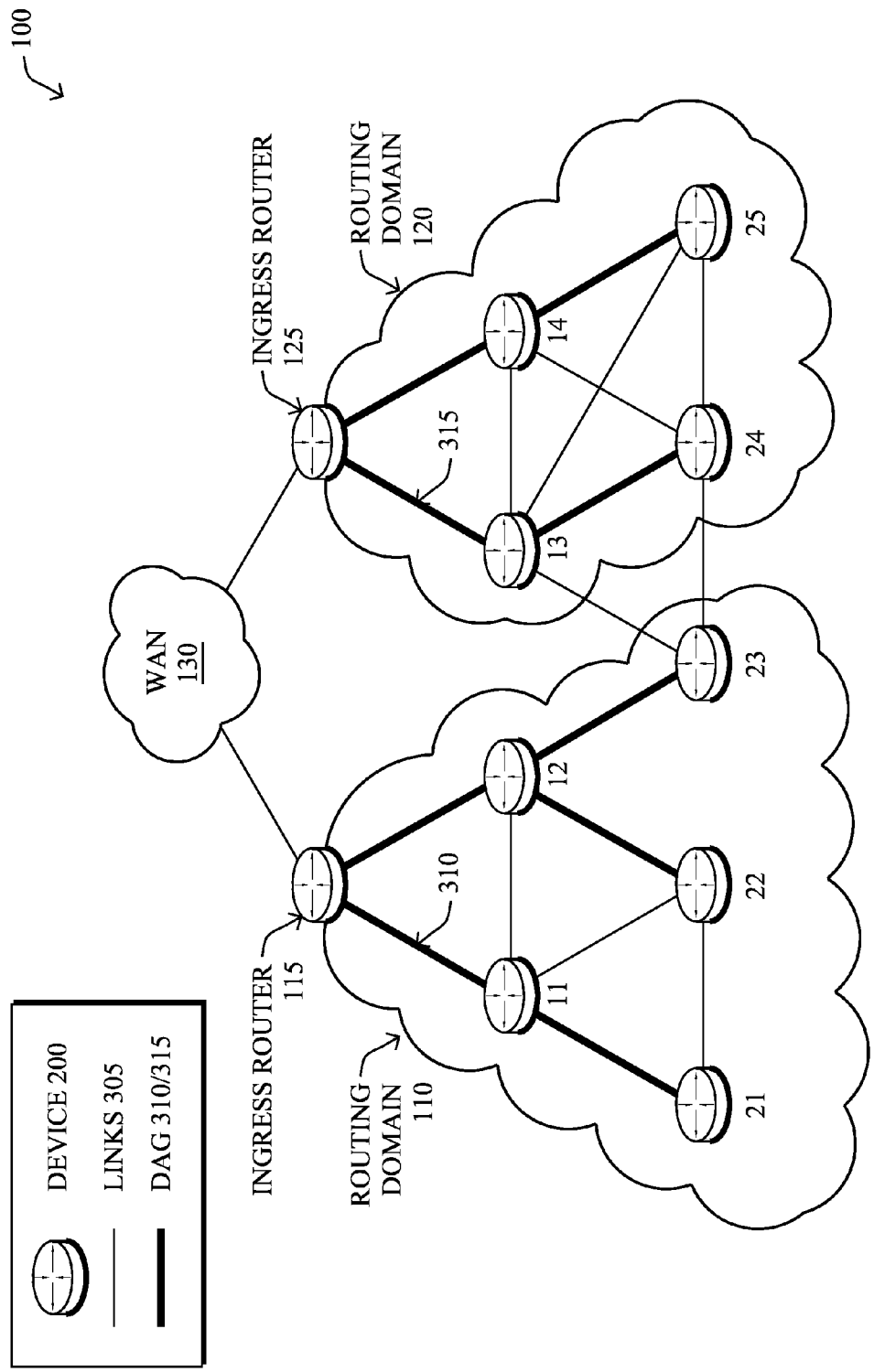
FIG. 3 illustrates an example of directed acyclic graphs (DAGs) in the computer network.

FIG. 3 illustrates an example pair of simplified DAGs 310 and 315 that may be created, e.g., through the techniques described above, within network 100 of FIG. 1, and is that may illustratively define an example pair of corresponding routing domains 110/120. For instance, certain links 305 may be selected for each node to communicate with a particular parent (and thus, in the reverse, to communicate with a child, if one exists). These selected links form the DAGs 310/315 (shown as bolded lines), which extend from a root node (e.g., a respective ingress router 115/125) toward one or more leaf nodes (nodes without children). Traffic/packets 140 (shown in FIG. 1) may then traverse the DAGs 310/315 in either the upward direction toward the root or downward toward the leaf nodes, particularly as described herein. Note that while the embodiments are shown herein with reference to a generally "tree" shaped network, the description herein is not so limited, and may be applied to networks that have branches emitting to all directions from with the root node generally centralized among a plurality of surrounding nodes.

As noted above, large scale LLNs are typically divided into smaller more manageable sub-networks or routing domains (often called a personal area network or "PAN", such as when using IEEE 802.15.4 terminology). Devices participate in only one routing domain at a time. To join a routing domain, devices generally must obtain a link-layer group key via access control mechanisms, configure IP routes to other devices in the same routing domain, and obtain global IP addresses that are topologically correct. Typically, each routing domain is assigned a unique prefix and all devices within a routing domain configure global IP addresses using the routing domain's prefix. (Note that ensuring that all IP addresses in a routing domain (e.g., PAN) are formed from the same prefix maximizes the benefits of route aggregation and header compression.)

Due to the scale and embedded nature of LLNs, devices autonomously join a routing domain and form associated routes to allow the forwarding of traffic. From time to time, LLN devices may choose to switch to a different routing domain, called routing domain migration. For example, one cause of routing domain migration is the loss of connectivity to other devices in the routing domain. Another cause is an attempt to optimize communication performance (e.g., by moving to a routing domain with fewer nodes or attaching to a device that advertises a lower route cost).

After joining a new routing domain, because in most cases routing domains and prefix allocation are tightly correlated, when moving to a new routing domain, the device is must obtain a new address, discover new routes, advertise its new address, and notify other services (e.g. DNS, NMS or application-specific) of its new address. As a result, during the migration process, services (e.g., IP-based services) attempting to send traffic to the migrated device will use the old address and messages will not be properly routed to the device. Note that as an example, nearly 10-15% of devices in a given routing domain may migrate every day, and with a scale that could reach millions of devices, a significant number of devices may be affected by the lost traffic conditions.

Routing Domain Migration

The techniques described herein dramatically increase the reliability of delivering messages in the presence of devices performing routing domain migrations. Generally, the routing domain ingress routers 115/125 maintain a copy of recent unicast and multicast packets sent into the routing domain (e.g., consistently or on-demand), and when devices move to a different routing domain, those devices can notify the ingress router(s) of the previous routing domain to forward any buffered messages destined for the migrate device, e.g., using IP tunneling.

Specifically, according to one or more embodiments of the disclosure as described in detail below, an ingress device of a first routing domain in a computer network buffers received packets, and in response to receiving a request from a particular node indicating that the particular node has migrated from the first routing domain to a second routing domain, determines how to reach the particular node in the second routing domain, and forwards the buffered received packets to the particular node in the second routing domain, accordingly. Also, according to one or more additional embodiments of the disclosure as described in detail below, a device in the first routing domain migrates from the first routing domain to a second routing domain, and determines its new IP address. The device may then send a request to the first ingress router to forward buffered packets for the device to the second routing domain at the new IP address, and may thus receive buffered packets forwarded from the first ingress router at the device in the second routing domain.

Illustratively, the techniques described herein may be performed by hardware, software, and/or firmware, such as in accordance with illustrative migration process 244, which may contain computer executable instructions executed by processor 220 to perform functions relating to the novel techniques described herein. For example, the techniques herein may be treated as extensions to conventional protocols, such as the RPL protocol, and as such, would be processed by similar components understood in the art that execute the RPL protocol, accordingly. Also, while the techniques herein generally indicate that the ingress device (e.g., a field area router, "FAR") perform certain aspects of the techniques herein, other management devices or head-end applications (e.g., network management services or "NMS" servers, etc.) may also make use of the techniques herein, accordingly.

Operationally, a first aspect of the techniques herein is to have routing domain ingress routers (e.g., FARs) maintain a copy of messages sent into the routing domain. In particular, in a typical LLN architecture, each routing domain has one or more FARs that provide WAN connectivity. For example, each FAR maintains a tunnel over the WAN 130 to a head-end router or NMS server in a Network Operations Center (NOC).

To reduce the number of dropped messages to devices that are performing a routing domain migration, the routing domain's ingress router (e.g., head-end, root node, FAR, etc.) maintains a copy of recent unicast and multicast messages forwarded into the routing domain, i.e., buffering received packets. As an example, in one embodiment, the "ingress router" as a head-end router (or NMS server) can maintain copies of messages destined for LLN devices in routing domains served by the head-end router/NMS server. In another embodiment, a FAR can maintain copies of messages destined for LLN devices within its routing domain. Note that one advantage of maintaining copies on the FAR is that it reduces the memory requirements for buffering on the head-end router by distributing the state into the FARs themselves. However, when a FAR must send those copies to a different location, it must utilize the WAN link (130), which may be unreliable or costly. For simplicity, the illustrative embodiment herein describes the process where buffering occurs at the FAR as the "ingress router," however this is not meant to limit the other embodiments from remaining within the scope of the description.

Generally, the techniques herein may function according to two particular modes of operation. In a first mode, packets 140 are always buffered by the ingress routers (e.g., a first ingress router 115), and a migrating node sends a request to retrieve packets sent during its move. In a second mode, when a node migrates to a new routing domain, it first sends a request to its current ingress router to start buffering its specific packets, and then sends a second request to retrieve the buffered packets once established in the new routing domain.

According to the first mode of operation, all packets received by the ingress device are buffered for a configured length of time. That is, the ingress router should maintain enough history to support the expected time it takes for LLN devices to perform a routing domain migration. Because LLNs typically utilize link technologies that provide relatively little throughput, buffering requirements for a routing domain are relatively modest. For example, assuming a FAR can deliver data into a routing domain at a rate of 76.8 kbps (which is far above the current expected sustained rate), maintaining one hour of messages would require only 34 MB of memory, well within the memory constraints typical for a FAR. While the data rate may increase with other link technologies, a FAR can only utilize a fraction of the link's potential in practical mesh network deployments.

Note that in certain embodiments herein, the first mode of operation may also selectively buffer packets. That is, according to the local policy or upon a specific buffering request (e.g., the second mode below), the ingress router may only buffer packets that belongs to a specific Class of Service (critical packets) or destined to specific nodes (e.g., actuators) according to some access list, wildcards, etc. In other words, the ingress router may buffer a select set of packets received, such as depending upon a particular type of packet, a particular class of service of packet, a particular priority of packet, a particular destination of the packets, etc.

According to the second more of operation, the previous ingress router does not buffer packets unless an explicit notification is received from a node in the routing domain. For instance, when a node plans to move to another routing domain (e.g., PAN) because it can get a better route to the DAG root, it sends an initial buffering request prior to migrating to the new routing domain. Upon receiving the buffering request, the previous ingress router starts buffering received packets destined to this node.

One advantage of the second mode of operation is that it requires less memory to buffer packets. On the other hand, if a node moves to a new routing domain (e.g., a new DAG) because of loss of connectivity with the old domain, packets may be lost since the buffering request cannot be sent. Notably, in one embodiment, the ingress router may operate using the first mode to buffer all packets, and may later decide to fall back to the second mode to await explicit instructions from migrating nodes (e.g., after sending a multicast message to all nodes informing them of the second mode) should the ingress device experience reduced resources (e.g., run out of memory). Further, as noted above, the ingress router may always buffer packets for certain devices (e.g., important devices), and may only buffer packets for specific other devices in response to an explicit request from those devices.

In both modes of operation, after a device has completed the routing domain migration process, it sends a forwarding request to the previous ingress router to forward any buffered messages destined for the migrated node. Notably, the migrating device is configured to maintain the IP addresses for itself for a period of time, thus the forwarding request may include any IP addresses it used in the old domain, including both unicast and multicast addresses. (Note that when using RPL, the FAR's IP address is equivalent to the DODAG ID, which is propagated in RPL DIO messages.) The forwarding request also includes a new IP address for the migrating node, which may be determined once the migrating node has established itself in the new routing domain, accordingly.

Figure 4A:
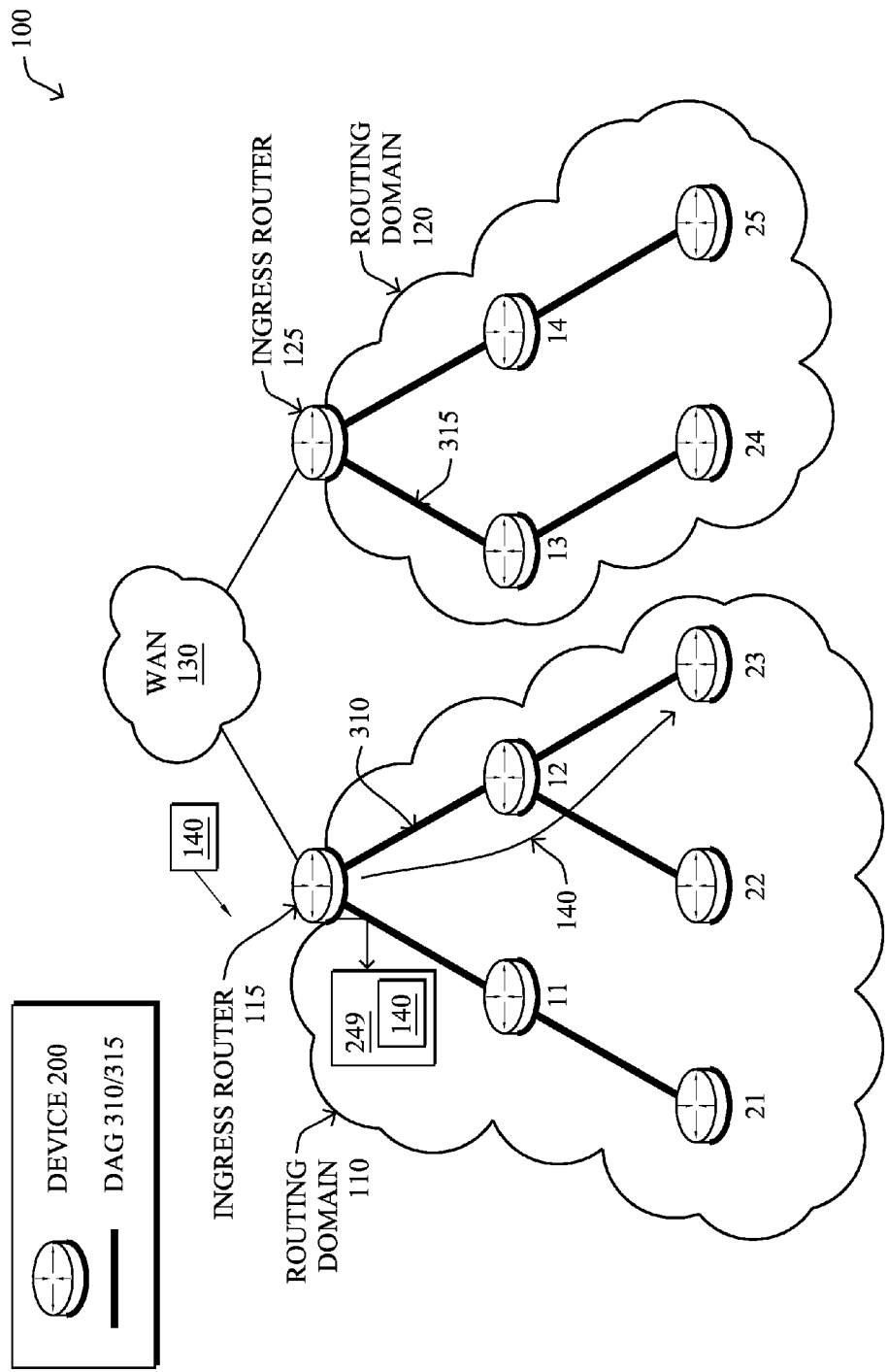
FIGS. 4A-4B illustrate an example of a first mode of routing domain migration.
Figure 4B:
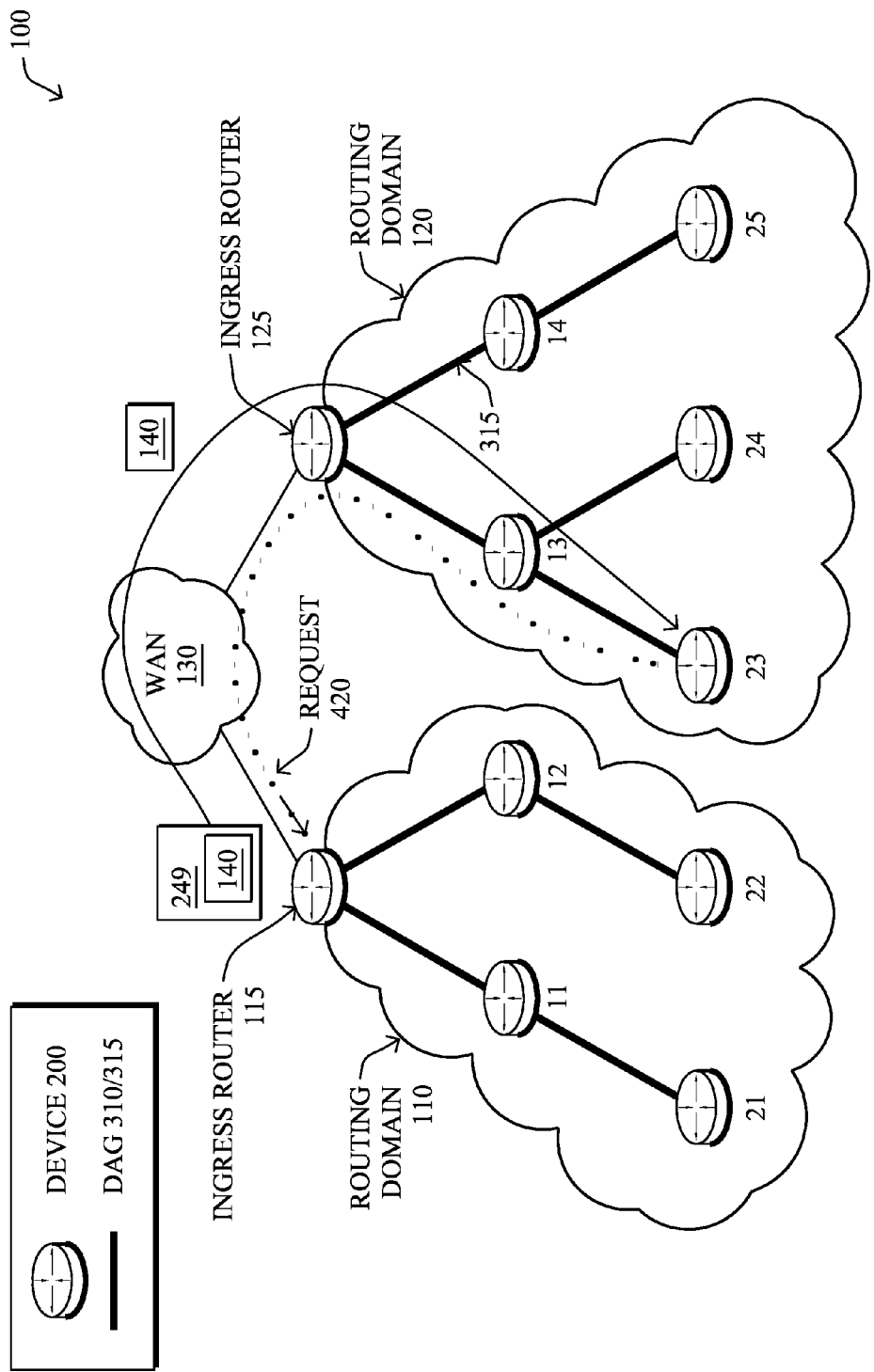

FIGS. 4A-4B and 5A-5C demonstrate the first and second mode of operation, respectively, according to one or more embodiments herein. For instance, FIG. 4A shows a first ingress router 115 of a first domain 110, e.g., the root of a DAG 310, buffering all packets 140 as they are received into its buffer 249. These buffered packets are also forwarded to the corresponding device within the routing domain, e.g., to node 23. At some point, node 23 migrates to the second routing domain 120, e.g., DAG 315, thus certain packets 140 may no longer reach node 23 in the previous domain. As shown in FIG. 4B, then, node 23, having joined the second routing domain (e.g., and having a newly associated IP address, e.g., "23a") sends a forwarding request 420 to the first ingress router 115 in order to retrieve its buffered packets 140.

Note that once the migrating node has established itself in the new domain, future traffic (packets 140) to the migrated device should be destined via the new domain in accordance with network convergence, as is understood by those skilled in the art. The buffered packets, therefore, are packets sent to the migrating device after the device has left the first routing domain, but before the network has accounted for the transition.

Figure 5A:
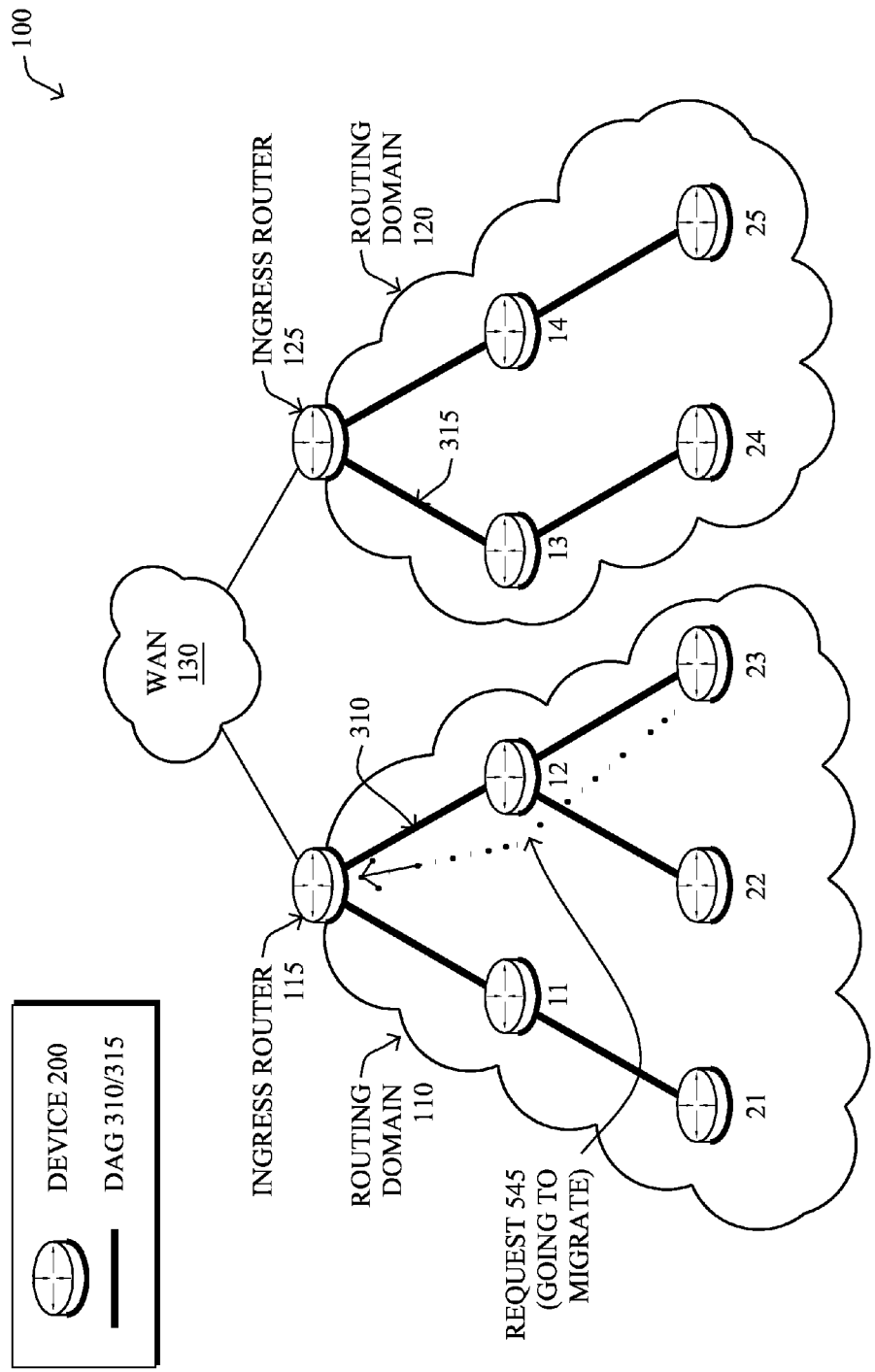
FIGS. 5A-5C illustrate an example of a second mode of routing domain migration.
Figure 5B:
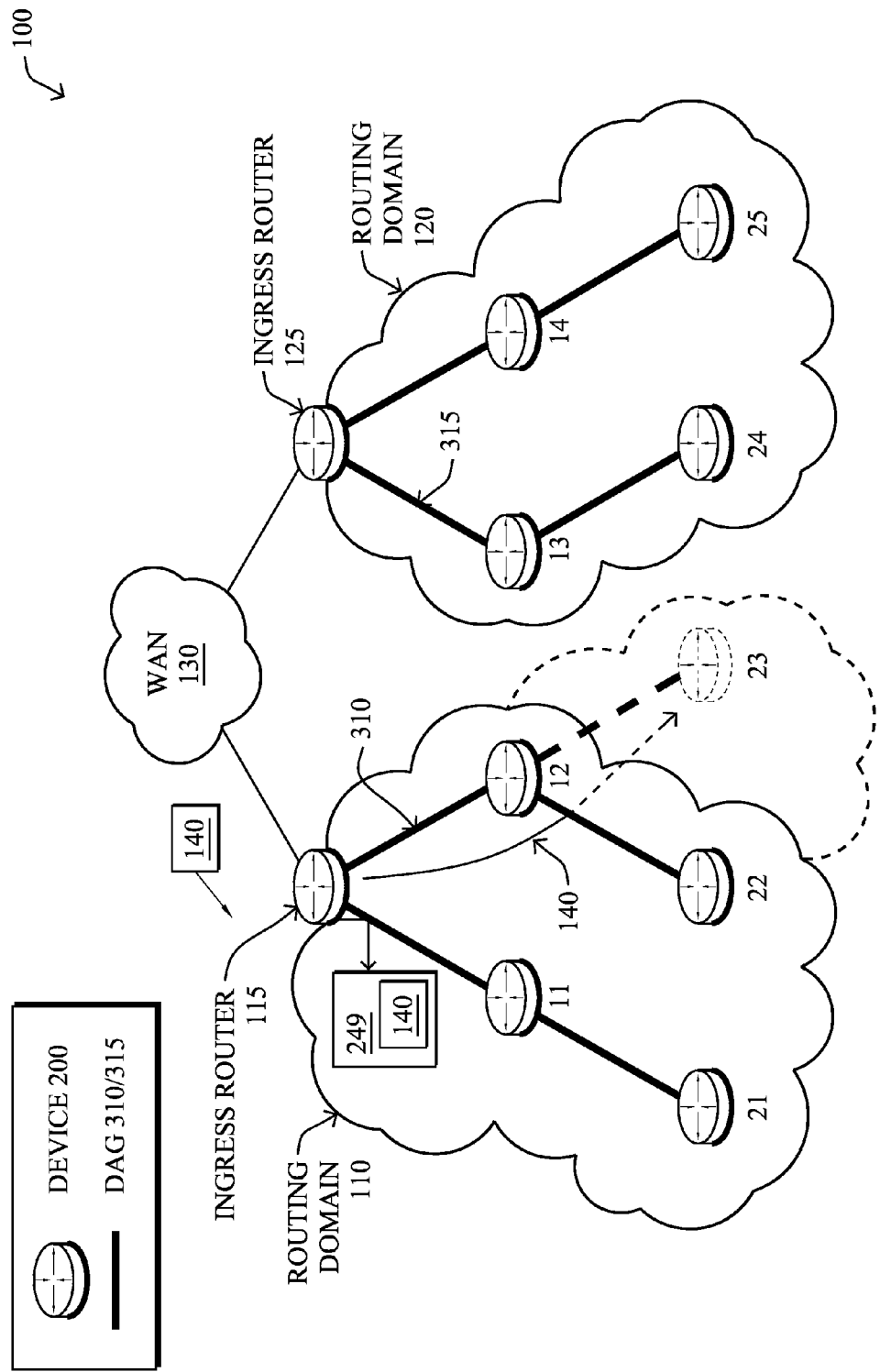
Figure 5C:
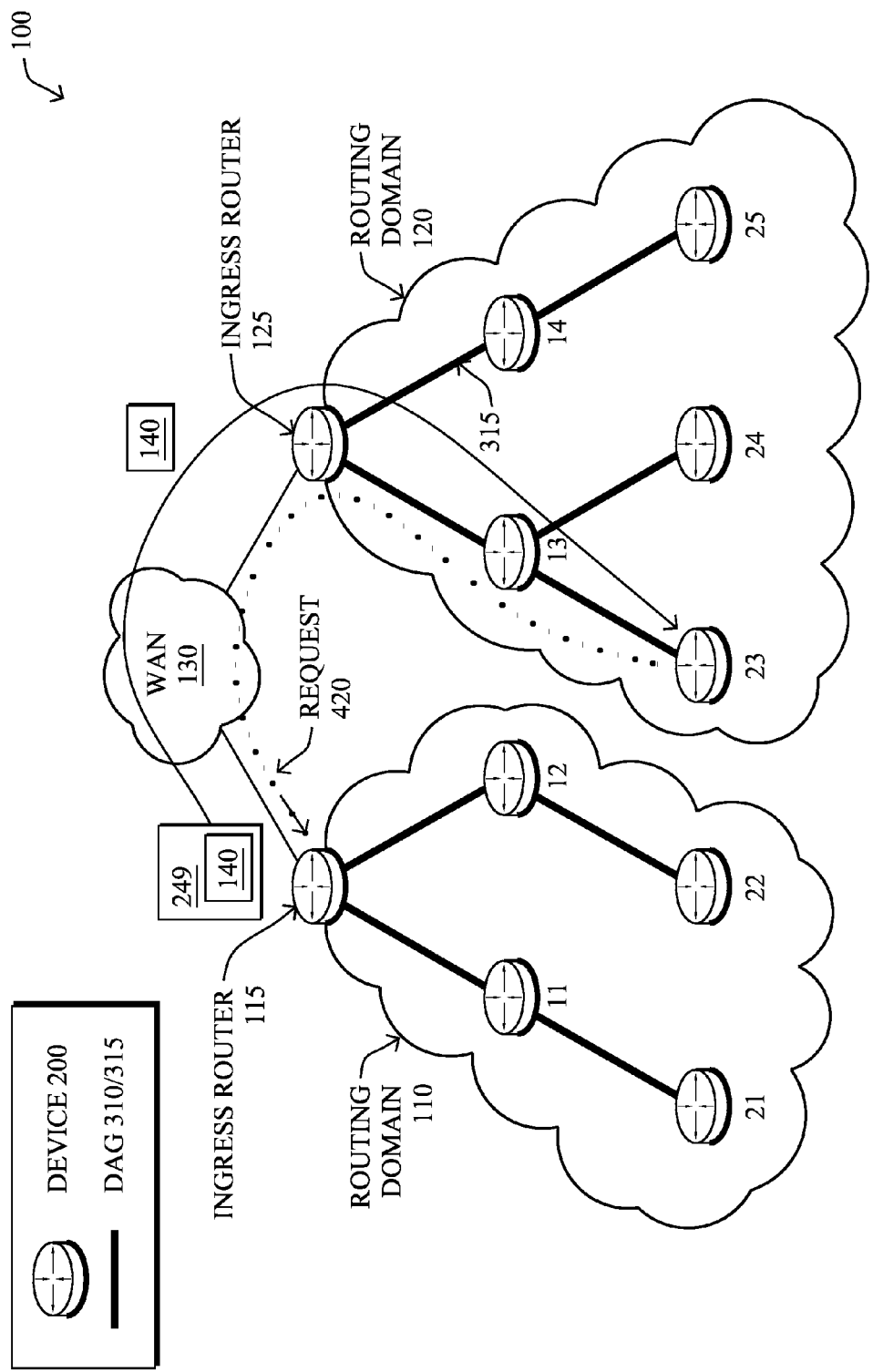

FIG. 5A, on the other hand, illustrates the second mode of operation, where a device planning to migrate to a new routing domain (e.g., device 23) sends an initial request 545 to its ingress router 115. In response, as shown in FIG. 5B, the ingress router then begins to buffer packets 140 destined to the migrating device, while also optionally continuing to forward the packets toward the migrating device. (Alternatively, e.g., to save resources, the ingress router may simply store, and not forward, the packets.) Once the migrating device has established itself in the second routing domain, it sends a forwarding request 420 to the first ingress router 115 in order to retrieve its buffered packets 140, similar to the first mode of operation.

As stated above, once the migration is completed (e.g., the node has moved to a new ingress router, thus new routing domain), the migrating node sends a forwarding request to the old ingress router. The forwarding request, in particular, indicates that the particular migrating node has migrated from the first routing domain to a second routing domain, and that the first/old ingress router should now send the buffered packets (and any future packets still sent to the old ingress router) destined to the migrating node's previous IP address, i.e., the address it had while in the first routing domain. In other words, upon receiving the forwarding request, if the old ingress router has or receives any messages destined for the migrated device, the old ingress router determines how to reach the migrating node in the new routing domain (e.g., based on network convergence, the new IP address, etc.), and forwards the buffered packets, accordingly. Note that the old ingress router may timeout buffering for a particular device (in the second mode of operation) if it has not received a forwarding request 420 after an extended period of time. Also, when a device is no longer requesting messages from the old ingress router, it may discard its old IP address and information about the old routing domain.

To forward the buffered packets, a previous ingress router (e.g., 115) may encapsulate both unicast and multicast packets (e.g., datagrams) as-is into a tunneling protocol. For instance, in its simplest aim, the buffered packets may be encapsulated with a new IP header destined for the device's new IP address. Accordingly, the migrated device will then receive the tunneled messages, decapsulate them, and process the message as if it were still in the old routing domain.

Figure 6:
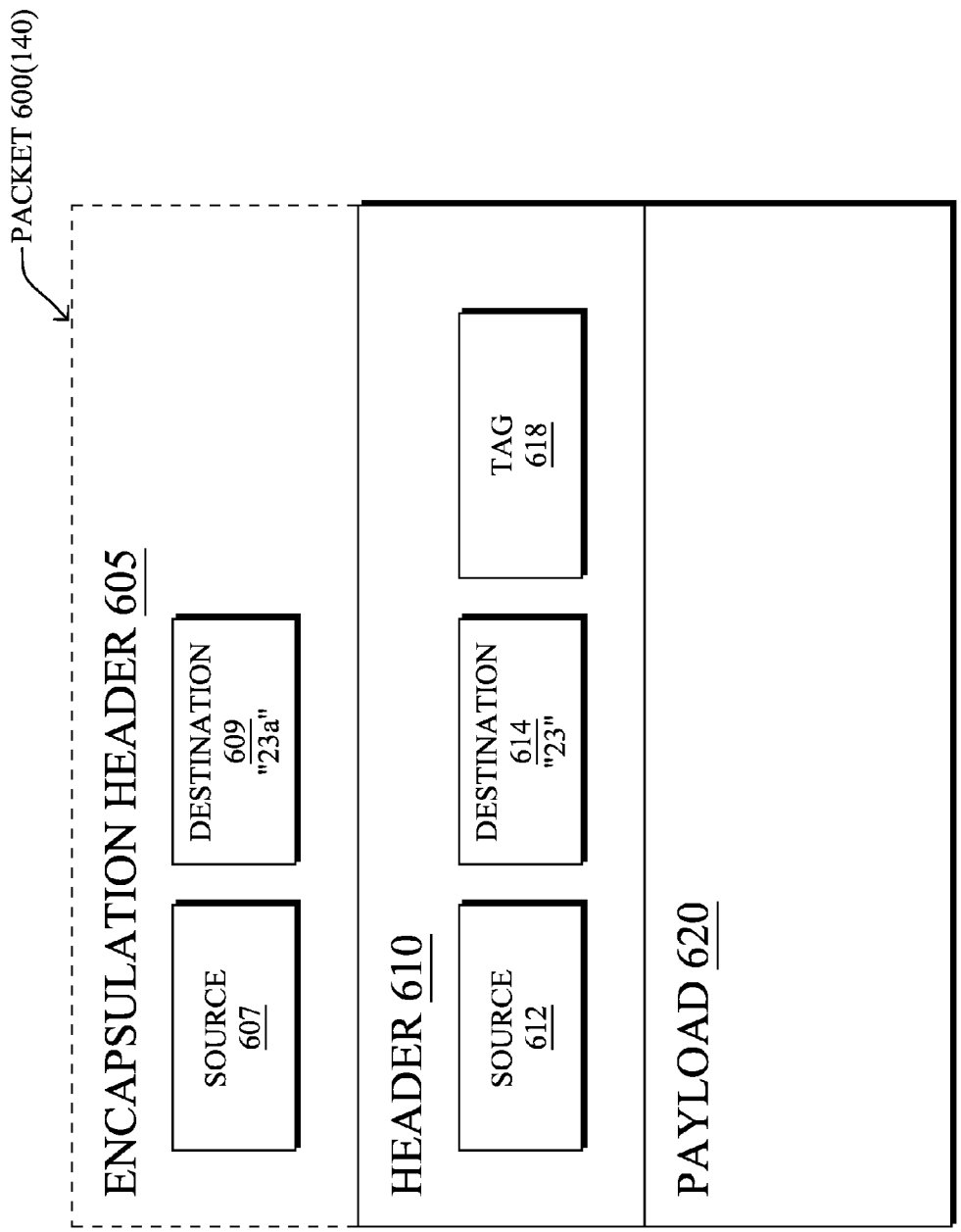
FIG. 6 illustrates an example packet.

As an example, FIG. 6 illustrates an example packet 600 (e.g., 140 in FIG. 1), which may generally comprise a header 610 and a payload 620. The header 610 contains information used to relay the packet, such as a source address 612 and destination address 614 (e.g., node 23's IP address). To encapsulate the buffered packets, a new header 605 may be pushed with the new IP address ("23*a*"), and the migrating node can then receive the buffered packet 600 at its new location in the new routing domain.

Note that in some cases, multiple devices may migrate from one routing domain to another simultaneously. As a result, any multicast messages destined for some or all of those devices may be more efficiently delivered using multicast communication. To support forwarding of multicast messages, a unicast-prefix-based multicast group is defined specifically for use with multicasting buffered messages from an old routing domain to migrated devices in a new routing domain (e.g., a "migration group"). LLN devices may thus subscribe to ("join") the multicast migration group after migrating to a new routing domain, and unsubscribe after they are done requesting messages from the old routing domain. By using a unicast-prefix-based multicast group in this manner, i.e., encapsulating the buffered packets in a corresponding multicast packet having a unicast prefix, the multicast scope can be limited to a single routing domain. Said differently, when multiple devices migrate from one routing domain to another routing domain, a FAR may receive multiple requests to forward messages to the same new routing domain (as indicated by the unicast prefix). As a result, the FAR may choose to forward multicast messages by encapsulating them in a new IP header destined for the multicast migration group.

According to one or more embodiments herein, techniques are supplied that avoid delivery (forwarding) of packets previously received by the migrating node while still in the previous/first routing domain. In particular, due to the lossy nature of LLNs, it is not uncommon to receive duplicate messages in normal operation. For example, when link-layer acknowledgments are dropped, a device may receive multiple copies due to retransmissions. Because IP and UDP (the user datagram protocol) do not provide their own mechanism to uniquely identify packets or datagrams, upper-layer protocols must be prepared to deal with duplicates. However, when forwarding copied messages from an old routing domain to a new routing domain, it is desirable to avoid sending those messages that have already been received by the migrating device to avoid wasting resources in an already resource-constrained environment.

To assist in forwarding only those messages that have not yet been received by a migrated device, the ingress routers can tag or otherwise timestamp all messages it sends into its routing domain. In one embodiment, the tag may contain a timestamp, e.g., based on some global time known to all devices in the domain, while in another embodiment, the "timestamp" is a sequence number. Note that the "tag" may be included in an IPv6 Destination Option, such as in field 618 of a packet (pre-encapsulation). LLN devices record the tag corresponding to the newest message (e.g., largest timestamp or sequence number) that was received. When making a request to retrieve buffered messages after a routing domain migration, the migrating device includes the tag so that the old ingress router can determine which messages have not yet been received. In other words, the forwarding request 420 may also contain a timestamp indicating which packets have already been received by the migrating device prior to migrating from the first routing domain. As such the previous ingress router need only forward those packets not already received (e.g., those after the timestamp/sequence number indicated).

FIG. 7 illustrates this concept in an example buffered packets association table 700, where each buffered packet 710 (e.g., "A" through "D") is associated with a corresponding timestamp 720 (e.g., "T1" through "T4", respectively). Upon receiving a forwarding request 420 from a migrated device, the ingress router determines whether there is an included timestamp/tag. Assume, for instance, that the last packet received by the migrated device was associated with timestamp/tag "T2." As such, the ingress router can assume that the migrating device was still receiving packets in the first routing domain until T2, and thus only needs to forward buffered packets "C" and "D". As an alternative, the forwarding request may simply indicate a time at which the migrating device left the first routing domain, and the ingress router may forward any packets received after that time (or after a short time before that time, to account for propagation delay). In this alternative embodiment, the timestamps/tags need not be carried within the packets transmitted to the LLN devices.

Figure 8:
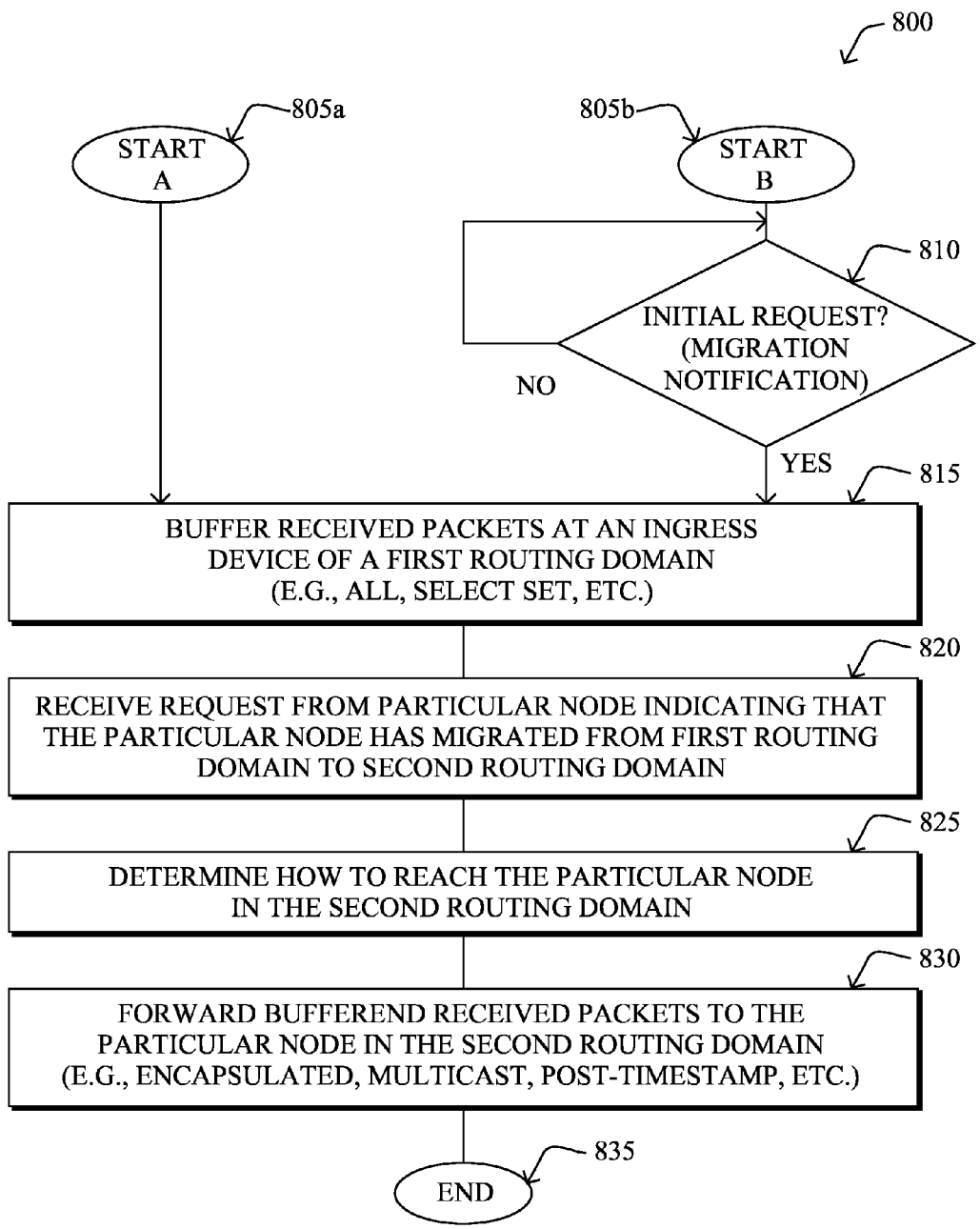
FIG. 8 illustrates an example simplified procedure for routing domain migration management, particularly from the perspective of an ingress router.

FIG. 8 illustrates an example simplified procedure for routing domain migration management in accordance with one or more embodiments described herein, particularly from the perspective of an ingress router. The procedure 800 may start at step 805*a* for the first mode discussed above, or in step 805*b* for the second mode discussed above. In particular, from step 805*b* in the second mode, the procedure continues to step 810, where, the ingress router 115 of a first routing domain 110 determines whether it has receive an initial request 545 (e.g., a migration notification) from a particular node in the first routing domain. In this mode of operation, in response to a received request (e.g., from node 23), then in step 815 the ingress router 115 buffers received packets 140. If operating under the first mode, then the procedure 800 may simply begin with buffering the received packets, as described above. Note that as also described above, the buffering may store all packets, a select set of packets, etc.

While buffering any received packets, in step 820 the ingress router may receive a request 420 from the particular node (e.g., node 23) indicating that it has migrated from the first routing domain to a second routing domain 120. Generally, the request 420 includes the new address of the particular node, and in step 825 the first ingress router 115 can determine how to reach the particular node in the second routing domain. Accordingly, any buffered received packets may then be forwarded in step 830 to the particular node in the second routing domain. For instance, as mentioned above, the packets may be encapsulated, multicast, and may be limited to only those that occurred after a timestamp 720, etc. The procedure 800 for this particular migrating node ends in step 835, though notably the procedure may continue to buffer packets for other nodes in step 815, or else wait for another node to indicate its intention to migrate in step 810.

Figure 9:
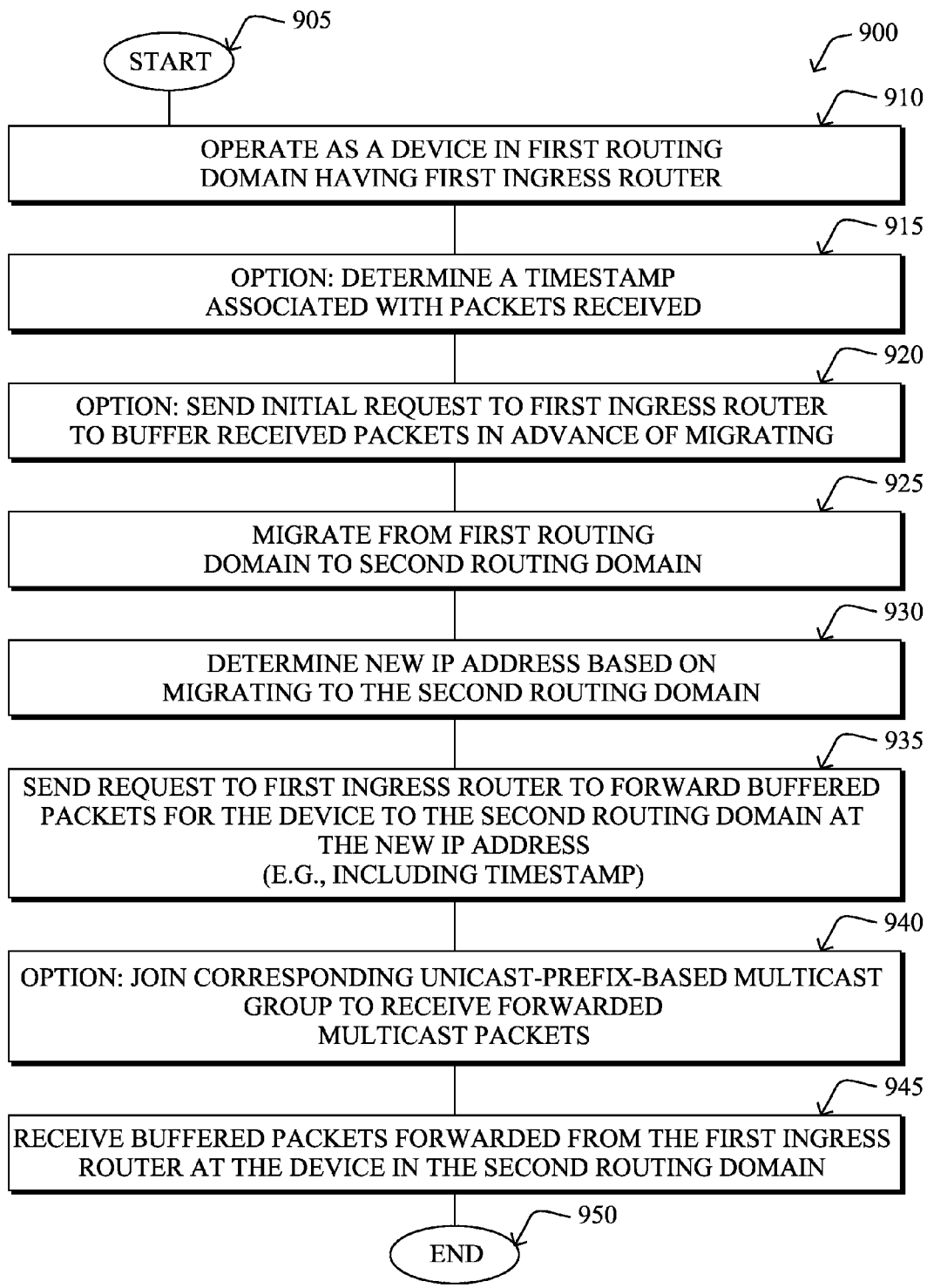
FIG. 9 illustrates an example simplified procedure for routing domain migration management, particularly from the perspective of a migrating device.

In addition, FIG. 9 illustrates an example simplified procedure for routing domain migration management in accordance with one or more embodiments described herein, particularly from the perspective of a migrating device. The procedure 900 starts at step 905, and continues to step 910, where, generally, a device (e.g., node 23) operates in a first routing domain 115. In step 915, as an optional feature as mentioned above, the device may determine timestamps associated with packets received, such that the timestamp information may be used to avoid redirecting packets unnecessarily. Also, in optional step 920, according to the second mode of operation, if the device knows that it is to migrate to another routing domain, then in step 920 it may send an initial request 545 to the first ingress router requesting the buffering of received packets in advance of the migration.

In step 925, the device (e.g., node 23) migrates from the first routing domain 110 to the second routing domain 120 as described in detail above, and accordingly in step 930 determines its new IP address. Once established in the second routing domain, in step 935 the migrated device sends a request 420 to the first ingress router to forward buffered packets for the device to the second routing domain at the new IP address. Note that the request may include the timestamp 720 mentioned above, in which case the forwarded packets could be limited to only those not previously received by the migrating device. Additionally, in optional step 940, in specific embodiments the migrating device may join a corresponding multicast group, or, more particularly, a corresponding unicast-prefix-based multicast group, to receive forwarded multicast packets.

In response to the request 420, buffered packets forwarded from the first ingress router may then be received at the device in the second routing domain in step 945, and the procedure 900 ends in step 950.

It should be noted, generally, that FIGS. 8-9 are merely examples for illustration, and are not meant to be limiting to the scope of the embodiments herein. For instance, while certain steps within the procedures 800 through 900 may be optional as described above, certain steps may be included or excluded as desired, and the steps may also be in a different order where suitable.

The novel techniques described herein, therefore, manage routing domain migration in computer networks. In particular, a system in accordance with the techniques herein introduces the concept of retaining copies of messages sent into a routing domain by an ingress router, and forwarding them as necessary to LLN devices that have migrated to a different routing domain (e.g., and that have obtained a new address by being in the new routing domain). Accordingly, the techniques herein reduce the occurrence of dropped messages while devices are performing a routing domain migration (increasing packet delivery metrics), and, as a result, higher layers need not invoke their reliability mechanisms as often, which may be costly in a resource-constrained environment such as LLNs.

While there have been shown and described illustrative embodiments that manage routing domain migration, e.g., in constrained computer networks, it is to be understood that various other adaptations and modifications may be made within the spirit and scope of the embodiments herein. For example, the embodiments have been shown and described herein with relation to LLNs, and more particularly, to the RPL protocol. However, the embodiments in their broader sense are not as limited, and may, in fact, be used with other types of networks and/or protocols, particularly those that may be constrained or would otherwise benefit from the techniques herein. Also, while the example routing domains 110/120 are generally shown as corresponding to DAGs 310/315, the migration between DAGs is merely one example of routing domain migration, and is not meant to be limiting on the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving an initial request from a particular node to buffer received packets;
   in response to the received request, buffering the received packets at an ingress device of a first routing domain in a computer network;
   receiving a request from a particular node indicating that the particular node has migrated from the first routing domain to a second routing domain; and
   in response,
      determining how to reach the particular node in the second routing domain; and
   forwarding the buffered received packets to the particular node in the second routing domain.

2. The method as in claim 1, wherein buffering comprises:
   buffering a select set of packets received by the ingress device.

3. The method as in claim 2, wherein the select set is selected from a group consisting of: a particular type of packet, a particular class of service of packet, a particular priority of packet, and a particular destination of the packets.

4. The method as in claim 1, wherein forwarding comprises:
   encapsulating one of the buffered received packets in a corresponding packet for forwarding having a destination address of the particular node in the second routing domain.

5. The method as in claim 1, wherein forwarding comprises:
   encapsulating one of the buffered received packets in a corresponding multicast packet for forwarding having a unicast prefix, wherein the particular node in the second routing domain is configured to join a corresponding unicast-prefix-based multicast group to receive the forwarded multicast packet.

6. The method as in claim 1, wherein the request contains a timestamp indicating which packets have already been received by the particular node prior to migrating from the first routing domain, and wherein forwarding comprises:
   forwarding only those packets not already received by the particular node prior to migrating from the first routing domain based on the timestamp.

7. The method as in claim 1, further comprising:
   continuing to receive additional packets at the ingress device for a period of time after receiving the request from the particular node indicating that the particular node has migrated from the first routing domain to a second routing domain; and forwarding the received additional packets to the particular node in the second routing domain.

8. The method as in claim 1, wherein the ingress device is a field area router (FAR), and wherein the routing domain is a Low power and Lossy Network (LLN) Personal Area Network (PAN).

9. An apparatus, comprising:
one or more network interfaces to communicate as an ingress device within a first routing domain in a computer network;
a processor coupled to the network interfaces and adapted to execute one or more processes; and
a memory configured to store a process executable by the processor, the process when executed operable to:
receive an initial request from a particular node to buffer received packets;
begin buffering the received packets in response to the received initial request;
receive a request from the particular node indicating that the particular node has migrated from the first routing domain to a second routing domain; and
in response,
determine how to reach the particular node in the second routing domain; and
forward the buffered received packets to the particular node in the second routing domain.

10. The apparatus as in claim 9, wherein the process when executed to buffer is operable to:
buffer a select set of packets received by the ingress device, wherein the select set is selected from a group consisting of: a particular type of packet, a particular class of service of packet, a particular priority of packet, and a particular destination of the packets.

11. The apparatus as in claim 9, wherein the request contains a timestamp indicating which packets have already been received by the particular node prior to migrating from the first routing domain, and wherein the process when executed to forward is operable to:
forward only those packets not already received by the particular node prior to migrating from the first routing domain based on the timestamp.

12. The apparatus as in claim 9, wherein the apparatus is a field area router (FAR), and wherein the routing domain is a Low power and Lossy Network (LLN) Personal Area Network (PAN).

13. A method, comprising:
operating as a device in a first routing domain having a first ingress router, the device having a first Internet Protocol (IP) address;
migrating from the first routing domain to a second routing domain having a second ingress router;
determining a second IP address for the device based on migrating to the second routing domain;
sending a request to the first ingress router to forward buffered packets for the device to the second routing domain at the second IP address; and
receiving buffered packets forwarded from the first ingress router at the device in the second routing domain.

14. The method as in claim 13, further comprising:
sending an initial request from the device to the first ingress router prior to migrating to the second routing domain, the request to buffer the received packets in advance of migrating.

15. The method as in claim 13, further comprising:
joining a corresponding unicast-prefix-based multicast group to receive forwarded multicast packets from the first ingress router.

16. The method as in claim 13, further comprising:
determining a timestamp associated with packets received while the device is located within the first routing domain; and
inserting within the request a timestamp indicating which packets have already been received by the device prior to migrating from the first routing domain.

17. An apparatus, comprising:
one or more network interfaces to communicate within a first routing domain in a computer network, the first routing domain having a first ingress router, the apparatus having a first Internet Protocol (IP) address within the first routing domain;
a processor coupled to the network interfaces and adapted to execute one or more processes; and
a memory configured to store a process executable by the processor, the process when executed operable to:
migrate from the first routing domain to a second routing domain having a second ingress router;
determine a second IP address for the apparatus based on migrating to the second routing domain;
send a request to the first ingress router to forward buffered packets for the apparatus to the second routing domain at the second IP address; and
receive buffered packets forwarded from the first ingress router at the apparatus in the second routing domain.

18. The apparatus as in claim 17, wherein the process when executed is further operable to:
send an initial request to the first ingress router prior to migrating to the second routing domain, the request to buffer the received packets in advance of migrating.

19. The apparatus as in claim 17, wherein the process when executed is further operable to:
determine a timestamp associated with packets received while the apparatus is located within the first routing domain; and
insert within the request a timestamp indicating which packets have already been received by the apparatus prior to migrating from the first routing domain.

* * * * *